US011551152B2

(12) United States Patent
Cmielowski et al.

(10) Patent No.: US 11,551,152 B2
(45) Date of Patent: Jan. 10, 2023

(54) INPUT FEATURE SIGNIFICANCE IDENTIFICATION BASED ON BATCHES OF PREDICTION

(71) Applicant: International Business Machines Corporation, Armonk, NY (US)

(72) Inventors: Lukasz G. Cmielowski, Cracow (PL); Maksymilian Erazmus, Zasow (PL); Rafal Bigaj, Cracow (PL); Wojciech Sobala, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 17/010,955

(22) Filed: Sep. 3, 2020

(65) Prior Publication Data
US 2022/0067578 A1 Mar. 3, 2022

(51) Int. Cl.
*G06Q 30/00* (2012.01)
*G06N 20/00* (2019.01)
*G06N 5/04* (2006.01)

(52) U.S. Cl.
CPC ............. *G06N 20/00* (2019.01); *G06N 5/04* (2013.01)

(58) Field of Classification Search
None
See application file for complete search history.

(56) References Cited

U.S. PATENT DOCUMENTS

| | | | |
|---|---|---|---|
| 7,318,051 B2 | 1/2008 | Weston et al. | |
| 8,706,670 B2 | 4/2014 | Hsieh et al. | |
| 2010/0235140 A1* | 9/2010 | Satonaga | G05B 23/024 702/179 |
| 2015/0161913 A1* | 6/2015 | Dominguez | G09B 19/167 434/66 |
| 2017/0354363 A1* | 12/2017 | Quatieri | G10L 25/21 |
| 2019/0303716 A1 | 10/2019 | Marwah et al. | |
| 2020/0005191 A1 | 1/2020 | Ganti et al. | |
| 2022/0019911 A1* | 1/2022 | Zhou | G06N 20/00 |

* cited by examiner

*Primary Examiner* — Matthew T Sittner
(74) *Attorney, Agent, or Firm* — Yee & Associates, P.C.

(57) ABSTRACT

Identifying input feature significance for a machine learning model is provided. A set of scoring payload data corresponding to a set of input features of the machine learning model is sliced into a predefined number of batches. Using the sliced set of scoring payload data, a correlation coefficient matrix for each respective input feature of the machine learning model is generated based on input of each particular input feature into the machine learning model and a corresponding output from the machine learning model for each particular input feature. A correlation coefficient value is extracted from the correlation coefficient matrix for each particular input feature and the corresponding output from the machine learning model. A set of significant input features having a corresponding correlation coefficient value greater than a predefined correlation coefficient threshold level is identified. A set of action steps is performed regarding the set of significant input features.

20 Claims, 3 Drawing Sheets

INPUT FEATURE SIGNIFICANCE IDENTIFICATION BASED ON BATCHES OF PREDICTION

BACKGROUND

1. Field

The disclosure relates generally to machine learning and more specifically to identifying significance of input features of a machine learning model based on correlation coefficient values corresponding to input features and their respective outputs (i.e., predictions and probabilities of those predictions) from the machine learning model.

2. Description of the Related Art

Machine learning is the study of computer algorithms that improve automatically through experience over time. Machine learning may be considered as a subset of artificial intelligence. Machine learning algorithms build a mathematical model based on sample data (i.e., training data) in order to make predictions without being explicitly programmed to do so. In other words, machine learning makes a prediction based on known features learned from the training data. Machine learning algorithms are used in a wide variety of applications where it is difficult or infeasible to develop conventional algorithms to perform needed tasks. For example, machine learning may be used for predicting whether a piece of fruit in a photo is a banana or an apple, identifying objects in front of a self-driving car, determining whether email is spam, recognizing speech accurately enough to generate captions for a video, and the like. Machine learning algorithms are trained to find patterns and features in large amounts of data in order to make predictions based on new data. The better the machine learning algorithm, the more accurate the predictions or decisions will become.

SUMMARY

According to one illustrative embodiment, a computer-implemented method for identifying input feature significance for a machine learning model is provided. A set of scoring payload data corresponding to a set of input features of the machine learning model is sliced into a predefined number of batches to form a sliced set of scoring payload data. Using the sliced set of scoring payload data, a correlation coefficient matrix for each respective input feature within the set of input features of the machine learning model is generated for each batch in the predefined number of batches based on input of each particular input feature into the machine learning model and a corresponding output from the machine learning model for each particular input feature indicating all combinations of input features and corresponding machine learning model outputs per batch. A correlation coefficient value is extracted from the correlation coefficient matrix for each particular input feature and the corresponding output from the machine learning model per batch. A set of significant input features having a corresponding correlation coefficient value greater than or equal to a predefined correlation coefficient threshold level is identified per batch. A set of action steps is automatically performed regarding the set of significant input features per batch. According to other illustrative embodiments, a computer system and computer program product for identifying input feature significance for a machine learning model are provided.

DETAILED DESCRIPTION

Figure 1:
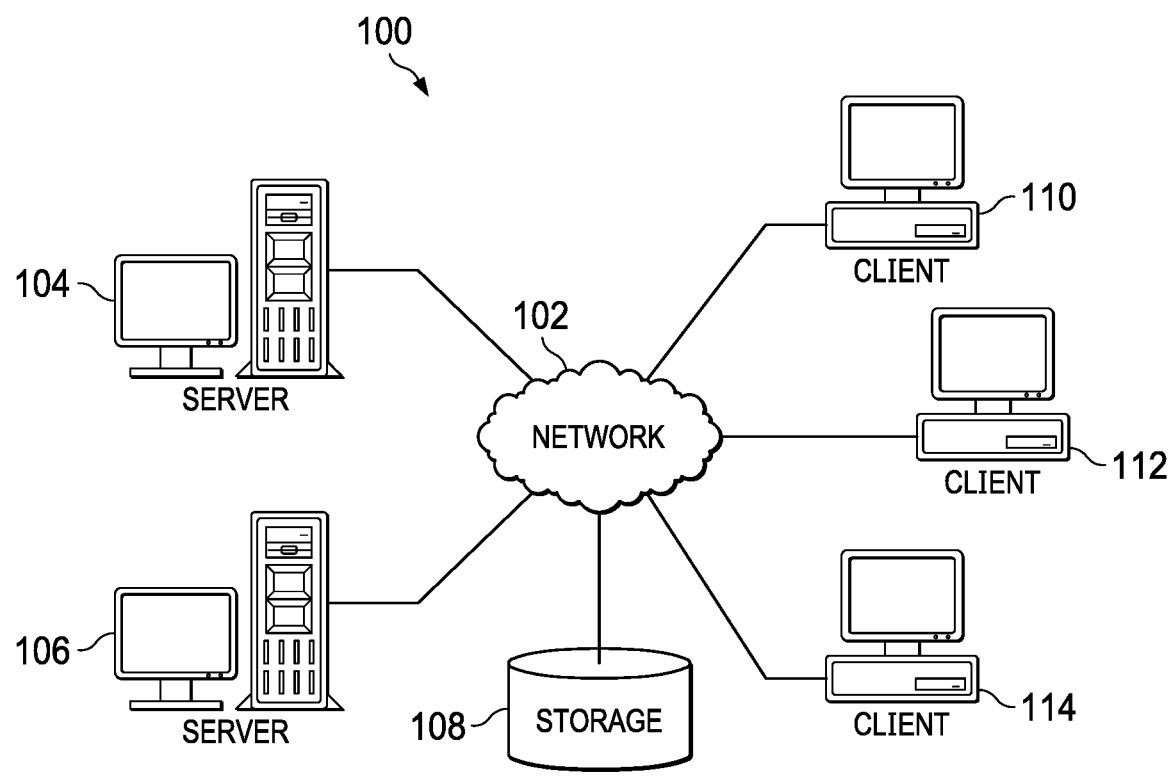
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
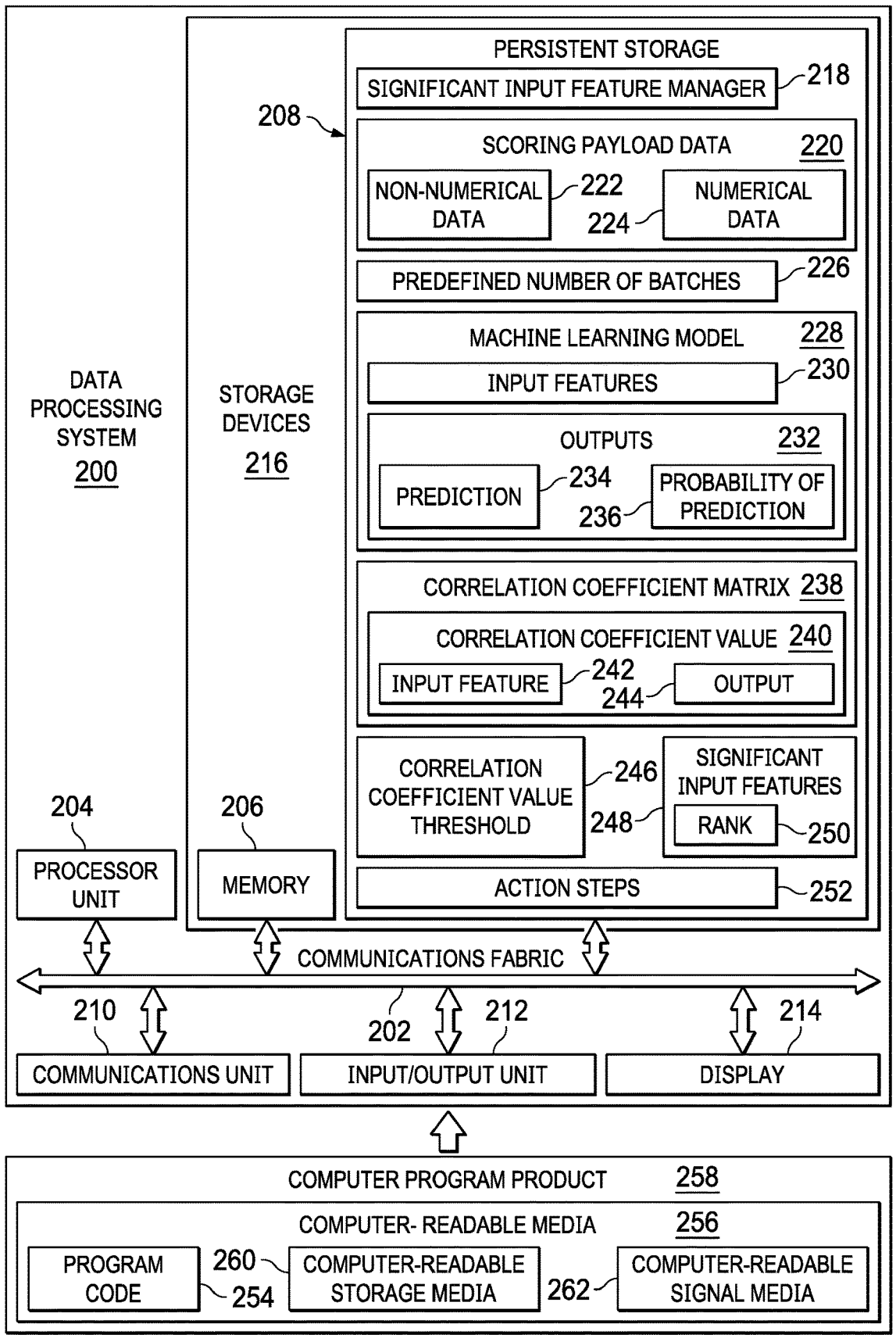
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide a service for identifying significant, important, or essential input features of a machine learning model. Server 104 and server 106 identify significant input features of a machine learning model by calculating correlation coefficient values between each respective input feature and its corresponding output from the machine learning model. Server 104 and server 106 then select those input features with a corresponding correlation coefficient value above a predefined threshold level as significant input features. Identification of significant input features enables a user of the service to determine which input features impact the machine learning model's output the most (e.g., which columns of the dataset are most important to the user in making business decisions).

It should be noted that server 104 and server 106 may each represent a cluster of servers in one or more data centers. Alternatively, server 104 and server 106 may each represent multiple computing nodes in one or more cloud environments.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart televisions, and the like, with wire or wireless communication links to network 102. Users of clients 110, 112, and 114 may utilize clients 110, 112, and 114 to access and utilize the significant input feature identification service provided by server 104 and server 106.

Storage 108 is a network storage device capable of storing any type of data in a structured format or an unstructured format. In addition, storage 108 may represent a plurality of network storage devices that correspond to one or more registered users of the service. A registered user may be, for example, an individual, a group, a company, a business, an organization, an agency, an institution, an enterprise, or the like. Further, storage 108 stores information, such as data, files, and the like, corresponding to the one or more registered users.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer readable program code or instructions implementing the significant input feature identification processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer readable storage device or a computer readable storage medium is any piece of hardware that is capable of storing information, such as, for example, without limitation, data, computer readable program code in functional form, and/or other suitable information either on a transient basis or a persistent basis. Further, a computer readable storage device or a computer readable storage medium excludes a propagation medium, such as transitory signals. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores significant input feature manager 218. However, it should be noted that even though significant input feature manager 218 is illustrated as residing in persistent storage 208, in an alternative illustrative embodiment significant input feature manager 218 may be a separate component of data processing system 200. For example, significant input feature manager 218 may be a hardware component coupled to communication fabric 202 or a combination of hardware and software components. In another alternative illustrative embodiment, a first set of components of significant input feature manager 218 may be located in data processing system 200 and a second set of components of significant input feature manager 218 may be located in a second data processing system, such as, for example, server 106 in FIG. 1.

Significant input feature manager 218 controls the process of identifying significant input features of a machine learning model corresponding to scoring payload data 220 based on correlation coefficient values corresponding to input features and their respective outputs from the machine learning model. Scoring payload data 220 represents a set of payload data that a user has requested to be scored for input feature significance. The set of payload data may correspond to stored, production, or live data associated with any topic, category, field, or domain, such as a healthcare domain, a financial domain, an educational domain, an entertainment domain, a business domain, or the like.

In this example, scoring payload data 220 comprises non-numerical data 222. Non-numerical data 222 may include, for example, one or more of words, symbols, pictures, graphics, video clips, audio recordings, and the like. Significant input feature manager 218 preprocesses non-numerical data 222 by transforming or converting non-numerical data 222 into numerical data 224. Numerical data 224 are zeros and ones, which represent non-numerical data 222. Alternatively, significant input feature manager 218 may transform non-numerical data 222 into some other machine readable format. Significant input feature manager 218 may transform non-numerical data 222 into another format using, for example, a standard procedure, such as extract, transform, load (ETL).

Significant input feature manager 218 utilizes predefined number of batches 226 to slice or segment preprocessed scoring payload data 220 (i.e., numerical data 224) into a number of data batches predefined by a user of the service. Predefined number of batches 226 may be, for example, seven batches. However, predefined number of batches 226 may be any number of batches, such as two, three, four, five, six, seven, eight, nine, ten, twenty, thirty, or the like. Significant input feature manager 218 may slice preprocessed scoring payload data 220 into predefined number of batches 226 by grouping preprocessed scoring payload data 220 into different sets of data by using, for example, at least one of timestamps, user-defined tags, key performance indicators, and a clustering algorithm. Significant input feature manager 218 may utilize timestamps to batch data by, for example, minute, hour, day, week, month, or any portion thereof. Significant input feature manager 218 may utilize user-defined tags to batch data based on a set of tags or labels input by the user. Significant input feature manager 218 may utilize key performance indicators to batch data based on a set of key performance indicators input by the user as critical business metrics. Significant input feature manager 218 may utilize a clustering algorithm, such as k-means clustering, to batch data based on data similarities or patterns.

Machine learning model 228 corresponds to scoring payload data 220. Machine learning model 228 may be, for example, a classifier. Machine learning model 228 derives insights from data so that the user can then utilize the insights to make better decisions. Insights represent the value obtained or gained through the use of machine learning analytics.

Significant input feature manager 218 inputs input features 230 into machine learning model 228 for each batch in predefined number of batches 226. Input features 230 represent a set of columns of scoring payload data 220. The set of columns may be selected by the user. Alternatively, the set of columns (i.e., input features) may be automatically selected by significant input feature manager 218 based on predefined criteria, rules, or policies.

Outputs 232 represent an output from machine learning model 228 corresponding to each respective input feature of input features 230 inputted into machine learning model 228. In this example, outputs 232 include prediction 234 and probability of prediction 236. Prediction 234 refers to an output of machine learning model 228 after machine learning model 228 has been trained on a historical dataset and is applied to new data when forecasting the likelihood of a particular outcome, such as whether a customer is likely to churn, possibility of fraudulent activity, and the like. For example, if machine learning model 228 outputs a prediction that a customer is likely to churn, then the user can target that customer with specific communications and outreach that may prevent the loss of that customer. Probability of prediction 236 indicates the likelihood of prediction 234 occurring or being true. The higher probability of prediction 236 is, the more likely it is that prediction 234 will occur or be true. Outputs 232 also include explainability, which provides an explanation, description, or justification for each prediction 234 in human understandable terms allowing the user to comprehend why machine learning model 228 made prediction 234.

Significant input feature manager 218 generates correlation coefficient matrix 238 for every combination of input feature in input features 230 and its corresponding output in outputs 232 for each respective batch in predefined number of batches 226. In other words, correlation coefficient matrix 238 is a table or similar data structure that shows each input feature with its corresponding machine learning model output for one batch of payload data. Correlation coefficient matrix 238 includes correlation coefficient value 240 for each input feature and its corresponding output, such as input feature 242 and output 244, for that particular batch of payload data. Correlation coefficient value 240 is a numerical value that indicates an amount of relationship or association between input feature 242 and output 244. The greater correlation coefficient value 240 is, the greater the relationship, association, or correlation between input feature 242 and output 244.

Significant input feature manager 218 compares correlation coefficient value threshold 246 with correlation coefficient value 240 of each input feature and its corresponding output from machine learning model 228 within correlation coefficient matrix 238. Correlation coefficient value threshold 246 is a predefined minimum threshold level for correlation coefficient value 240. In other words, significant input feature manager 218 only selects those input features with a corresponding correlation coefficient value greater than or equal to correlation coefficient value threshold 246 as significant input features 248. Significant input features 248 have the greatest impact on the output of machine learning model 228. By identifying significant input features 248, significant input feature manager 218 can increase the prediction accuracy of machine learning model 228.

Subsequent to identifying significant input features 248, significant input feature manager 218 lists significant input features 248 by rank 250 according to a corresponding correlation coefficient value of each respective significant input feature of significant input features 248. Thus, significant input feature manager 218 places a significant input feature with a highest corresponding correlation coefficient value first in the list of significant input features, a significant input feature with a second highest corresponding correlation coefficient value second in the list, and so on.

Further, significant input feature manager 218 performs action steps 252 after generating the list of significant input features according to rank 250. Action steps 252 represent a set of one or more action steps. Action steps 252 may include, for example, transmitting the list of significant input features 248 by rank 250 to the user for review to determine which data are important or valuable to the user in making decisions. Moreover, significant input feature manager 218 may perform further data analysis to identify relationships between business metrics, such as key performance indicators, and input feature significance to determine which input features impact or effect the greatest number of business metrics. Significant input feature manager 218 may also perform data engineering by utilizing correlation coefficient values among input features to identify duplicates and similarities among the input features to increase performance of machine learning model 228. In addition, significant input feature manager 218 may analyze correlation coefficient value trends of input features to detect data drift and data anomalies in machine learning model 228.

As a result, data processing system 200 operates as a special purpose computer system in which significant input feature manager 218 in data processing system 200 enables identification of significant input features of a machine learning model. In particular, significant input feature manager 218 transforms data processing system 200 into a special purpose computer system as compared to currently available general computer systems that do not have significant input feature manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 254 is located in a functional form on computer readable media 256 that is selectively removable and may be loaded onto or transferred to data processing system 200 for running by processor unit 204. Program code 254 and computer readable media 256 form computer program product 258. In one example, computer readable media 256 may be computer readable storage media 260 or computer readable signal media 262.

In these illustrative examples, computer readable storage media 260 is a physical or tangible storage device used to store program code 254 rather than a medium that propagates or transmits program code 254. Computer readable storage media 260 may include, for example, an optical or magnetic disc that is inserted or placed into a drive or other device that is part of persistent storage 208 for transfer onto a storage device, such as a hard drive, that is part of persistent storage 208. Computer readable storage media 260 also may take the form of a persistent storage, such as a hard drive, a thumb drive, or a flash memory that is connected to data processing system 200.

Alternatively, program code 254 may be transferred to data processing system 200 using computer readable signal media 262. Computer readable signal media 262 may be, for example, a propagated data signal containing program code 254. For example, computer readable signal media 262 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 256" can be singular or plural. For example, program code 254 can be located in computer readable media 256 in the form of a single storage device or system. In another example, program code 254 can be located in computer readable media 256 that is distributed in multiple data processing systems. In other words, some instructions in program code 254 can be located in one data processing system while other instructions in program code 254 can be located in one or more other data processing systems. For example, a portion of program code 254 can be located in computer readable media 256 in a server computer while another portion of program code 254 can be located in computer readable media 256 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 254.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Machine learning models need to be explainable. Explainability of machine learning model output is a must. Explainability allows a user to understand why a machine learning model made a particular prediction and not a different prediction. For example, if a machine learning model rejected a user payload data request, then explainability answers the question as to why the machine learning model recommended the rejection. In other words, explainability is the extent to which the internal mechanics of a machine learning model can be explained in human terms. Explaining predictions to users is necessary for building user trust in the predictions of the machine learning model.

Current solutions, such as, for example, Local Interpretable Model-Agnostic Explanations (LIME), can explain a single prediction. The cost of such prediction explainability is high. For example, these current solutions generate multiple data records that are next sent for scoring in order to return a single prediction. This process is time consuming and cost generating since the user is charged for the scoring. This process also does not work at scale for batches of predictions, but for a single prediction. In the case of a production or live system, the number of predictions generated is large (i.e., thousands or millions). The ability to explain all of these predictions and analyze the results (e.g., descriptive statistics) is a new requirement in the field of machine learning.

Illustrative embodiments identify the significance of input features of a machine learning model based on a calculated correlation coefficient value between each input feature and its corresponding output from the machine learning model. As used herein, scoring payload data means input to and output from a machine learning model. The input to the machine learning model includes a set of input features or columns of the payload data, such as, for example, job, income, employer, location, credit, loan, and the like. The output of the machine learning model includes a prediction and a probability of the prediction for each input feature.

Illustrative embodiments first preprocess a set of scoring payload data corresponding to a set of input features of a machine learning model. For the preprocessing pipeline, illustrative embodiments may utilize, for example, a standard process, such as an extract, transform, load procedure or the like. The preprocessing pipeline transforms or converts non-numerical data into one of numerical data or machine readable data by encoding column or categorical entries. The preprocessing pipeline may also perform any other operations that may be required to make the input feature data ready for correlation coefficient calculations. However, it should be noted that data preprocessing may not be necessary. In other words, the input feature data may already be in a numerical or machine-readable format.

An example of original scoring payload data is as follows:
day  CheckingStatus  LoanDuration  CreditHistory LoanPurpose
LoanAmount  ExistingSavings  EmploymentDuration InstallmentPercent
InstallmentPlans_IX_Job_IX_LoanPurpose_IX_OthersOnLoan_IX
OwnsProperty_IX_Telephone_IX
0 0 less_0 20 prior_payments_delayed vacation 6954 less 100 less 1 3 . . .
0.0 3.0 6.0 1.0 0.0 1.0 1.0 0.0
1 0 no_checking 4 credits_paid_to_date_car_used 250 less_100 1_to_4 3
. . . 0.0 0.0 2.0 0.0 0.0 0.0 1.0 0.0
2 0 no_checking 40 all_credits_paid_back other 250 100_to_500
unemployed 2 . . . 0.0 0.0 10.0 0.0 1.0 0.0 1.0 1.0

An example of scoring payload data after preprocessing (e.g., transforming non-numerical data into numerical data) is as follows:
CheckingStatus_0_to_200  CheckingStatus_greater_200 CheckingStatus_less_0
CheckingStatus_no_checking  CreditHistory_all_credits_paid_back
CreditHistory_credits_paid_to_date  CreditHistory_no_credits
CreditHistory_outstanding_credit  CreditHistory_prior_payments_delayed
LoanPurpose_appliances . . . CreditHistory_IX_OthersOnLoan_IX day
OwnsProperty_IX prediction_probability InstallmentPercent
ExistingCreditsCount Telephone_IX
0 0.0 0.0 1.0 0.0 0.0 0.0 0.0 0.0 1.0 0.0 . . . 0.0 1.00 1.0 0.0 0.0 0.670711 3 1 1.0
1 0.0 0.0 0.0 1.0 0.0 1.0 0.0 0.0 0.0 0.0 . . . 1.0 0.0 0 0 0.0 0.0 0.0 0.788291 3 1 1.0
2 0.0 0.0 0.1 0.0 1.0 0.0 0.0 0.0 0.0 0.0 0.0 . . . 3.0 0.0 0 0.0 1.0 0.0 0.530031 2 1 1.0
3 0.0 0.0 0.0 1.0 0.0 0.0 0.0 0.0 0.0 1.0 0.0 . . . 0.0 0.0 0 0 0.0 2.0 0.0 0.709516 3 1 0.0
4 0.0 0.0 0.0 1.0 0.0 0.0 0.0 0.0 0.0 1.0 0.0 . . . 0.0 0.0 0 0 0.0 2.0 0.0 0.732245 3 2 0.0

After illustrative embodiments transform the non-numerical data into a numerical or machine-readable format, illustrative embodiments slice the preprocessed scoring payload data into a predefined number of batches, such as, for example, seven. It should be noted that a user defines the number of batches. Also, it should be noted that illustrative embodiments may process any user-defined number of batches. Illustrative embodiments slice the preprocessed scoring payload data into the predefined number of batches by grouping or segmenting the preprocessed scoring payload data based on at least one of: timestamp (e.g., a defined range of time, such as hourly, daily, weekly, monthly, or the like); user-defined tags; a clustering algorithm (e.g., k-means clustering); and a key performance indicator. As a result, illustrative embodiments generate a sliced set of scoring payload data. The user also selects which slicing mechanism illustrative embodiments will utilize to generate the predefined number of batches.

Using the sliced set of scoring payload data, illustrative embodiments generate a correlation coefficient matrix for each respective input feature within the set of input features of the machine learning model that correspond to one batch in the predefined number of batches based on input of a particular input feature and corresponding output of the machine learning model (i.e., prediction and probability of the prediction) for that particular input feature. Illustrative embodiments repeat this process for each batch in the predefined number of batches. In other words, illustrative embodiments build a correlation coefficient matrix for all combinations of input features and their corresponding outputs from the machine learning model for each batch.

An example of a correlation coefficient matrix built by illustrative embodiments for a single batch is as follows:
CheckingStatus_0_to_200  CheckingStatus_greater_200 CheckingStatus_less_0
CheckingStatus_no_checking  CreditHistory_all_credits_paid_back
CreditHistory_credits_paid_to_date  CreditHistory_no_credits
CreditHistory_outstanding_credit  CreditHistory_prior_payments_delayed
LoanPurpose_appliances . . . OthersOnLoan_IX Age CreditHistory_IX
InstallmentPercent Telephone_IX Housing_IX OwnsProperty_IX
CheckingStatus_0_to_200    1.000000    −0.150668 −0.391553 −0.446102 −0.012507
0.007499 −0.032562 0.016226 −0.000618 0.024043 . . . −0.055873 0.016420 NaN
0.013120 −0.001984 −0.015143 −0.027166 0.012442 0.057792 −0.020597
CheckingStatus_greater_200    −0.150668    1.000000 −0.175536 −0.199990 −0.017117
0.049392    −0.019942    −0.015572    −0.014854 −0.002382 . . . 0.035693 −0.028177 NaN
0.015358 0.033421 −0.018165 0.009744 −0.028030 0.033533 0.036710
CheckingStatus_less_0 −0.391553 −0.175536 1.000000 −0.519732 −0.014683 −
0.052765 0.024916 0.033860 0.025768 0.032950 . . . −0.007160 −0.013934 NaN
0.010627 −0.016967 0.001724 0.008338 −0.013866 −0.053785 −0.037307
CheckingStatus_no_checking    −0.446102    −0.199990 −0.519732 1.000000 0.033940

0.019025 0.015366 −0.039218 −0.016691 −0.052006 . . . 0.039052 0.012824 NaN −
0.029713 0.001229 0.021091 0.011478 0.016256 −0.017159 0.035802
CreditHistory_all_credits_paid_back −0.012507 −0.017117 −0.014683 0.033940
1.000000 −0.278156 −0.067858 −0.212968 −0.305450 0.026122 . . . 0.061802 −
0.031764 NaN 0.032138−0.028993 0.662145−0.053867− 0.014465 0.007243
0.032047
5 rows×78 columns Illustrative embodiments then extract, from the correlation coefficient matrix, a correlation coefficient value for each input feature and its corresponding output from the machine learning model. Afterward, illustrative embodiments identify a set of one or more significant input features, each significant input feature in the set having a corresponding correlation coefficient value greater than or equal to a predefined correlation coefficient threshold level. In this step, illustrative embodiments identify and select the correlation coefficient values corresponding to the input features or columns representing the predictions (i.e., outputs of the machine learning model). In other words, illustrative embodiments filter correlation information for each input feature and output prediction. Next, illustrative embodiments rank correlation coefficient values greater than or equal to the predefined correlation coefficient threshold level depending on a respective correlation coefficient value. For example, the higher a correlation coefficient value is, the more significant that particular corresponding input feature is. It should be noted that illustrative embodiments may utilize an absolute value for correlation coefficient values for ranking purposes. Illustrative embodiments repeat this process for each batch.

For example, the ranked correlation coefficient values of corresponding input features for seven batches may be as follows:

**BATCH1****
-input feature name |-correlation coefficient
LoanDuration 0.418201
Age 0.349055
CheckingStatus_no_checking 0.329890
CurrentResidenceDuration 0.270491
EmploymentDuration_4_to_7_0.260223
Name: prediction_predictionprobability, dtype: float64
**********
**BATCH2****
-input feature name |-correlation coefficient
LoanDuration 0.404938
Age 0.368426
CheckingStatus_no_checking 0.333460
EmploymentDuration_4_to_7 0.266259
EmploymentDuration_less_1 0.260675
Name: prediction_predictionprobability, dtype: float64
**********
**BATCH3****
-input feature name |-correlation coefficient
LoanDuration 0.411467
Age 0.354268
CheckingStatus_no_checking 0.331438
CurrentResidenceDuration 0.264285
OwnsProperty_real_estate 0.225470
Name: prediction_predictionprobability, dtype: float64
**********
**BATCH4****
-input feature name |-correlation coefficient
LoanDuration 0.384240
CheckingStatus_no_checking 0.377019
Age 0.321924
EmploymentDuration_less_1 0.245082
EmploymentDuration_greater_7 0.234822
Name: prediction_predictionprobability, dtype: float64
**********
**BATCH5****
-input feature name |-correlation coefficient
LoanDuration 0.410673
CheckingStatus_no_checking 0.329666
Age 0.308822
CurrentResidenceDuration 0.240355
EmploymentDuration_4_to_7 0.228191
Name: prediction_predictionprobability, dtype: float64
**********
**BATCH6****
-input feature name |-correlation coefficient
LoanDuration 0.388946
Age 0.350217
CheckingStatus_no_checking 0.316477
OwnsProperty_real_estate 0.261152
CurrentResidenceDuration 0.229569
Name: prediction_predictionprobability, dtype: float64
**********
**BATCH7****
-input feature name |-correlation coefficient
LoanDuration 0.443045
Age 0.339219
CheckingStatus_no_checking 0.319380
CurrentResidenceDuration 0.245888
OwnsProperty_real_estate 0.235945
Name: prediction_predictionprobability, dtype: float64
**********

Afterward, illustrative embodiments automatically perform a set of action steps regarding the set of significant input features identified by illustrative embodiments. For example, illustrative embodiments may send a notification to a user regarding the set of significant input features, which most impact or influence the output (i.e., predictions and probability of the predictions) of the machine learning model. As another example, illustrative embodiments may automatically perform further analysis of the set of significant input features. For example, illustrative embodiments adopt the previously calculated input feature significance to: a) perform an analysis that identifies relationships between business metrics, such as key performance indicators, and input feature significance, which may identify which input feature or features impact the most business metrics; b) perform input feature engineering by utilizing correlation coefficients among input features, themselves, to identify duplicates or similarities among the input features to optimize the machine learning model and its deployment; and c) detect data drift or anomalies in the machine learning model by analyzing correlation coefficient trends of input features. By using descriptive statistics, illustrative embodiments can monitor change in correlation coefficient value per each input feature and detect when correlation coefficient trends change in input feature significance. Illustrative embodiments calculate the input feature significance on real time production or live data corresponding to a scoring payload data request. Therefore, it is possible for illustrative embodiments to detect data drift or anomalies in the machine learning model and react in real time.

As a result, illustrative embodiments are capable of detecting data drift and anomalies in a batch of transaction data, not each transaction separately. Thus, illustrative embodiments calculate explainability of each batch of transaction data. In other words, illustrative embodiments provide a scalable and optimized way of monitoring explainability of a batch of data records in real time allowing a user to determine what data are important and what data are not important to the user in real time. Consequently, illustrative embodiments increase accuracy and performance of the machine learning model and, therefore, increase performance of the computer, itself.

Thus, illustrative embodiments provide one or more technical solutions that overcome a technical problem with identifying significant input features of a machine learning model and providing machine learning model output explainability. As a result, these one or more technical solutions provide a technical effect and practical application in the field of machine learning.

Figure 3:
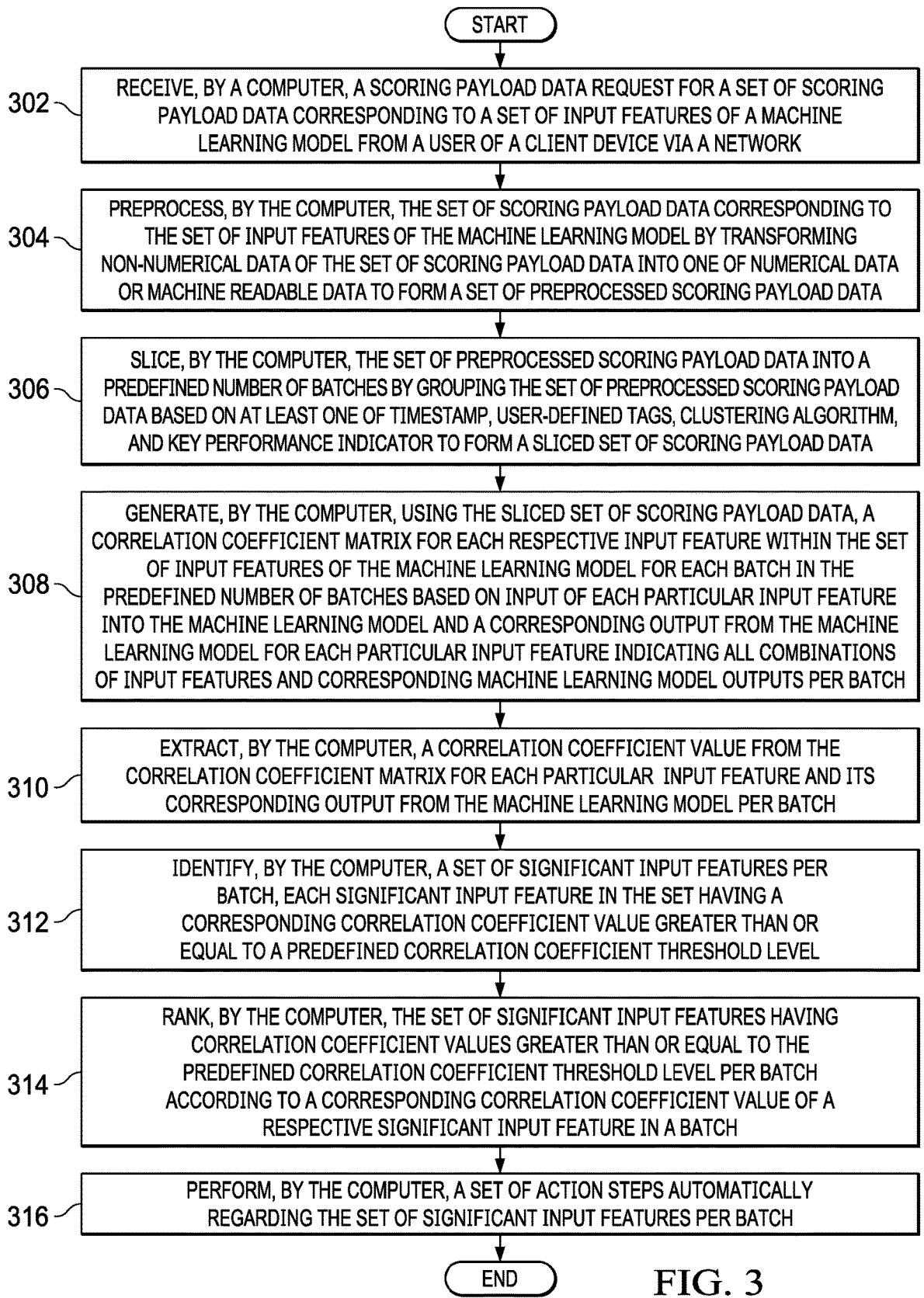
FIG. 3 is a flowchart illustrating a process for identifying input feature significance for a machine learning model in accordance with an illustrative embodiment.

With reference now to FIG. 3, a flowchart illustrating a process for identifying input feature significance for a machine learning model is shown in accordance with an illustrative embodiment. The process shown in FIG. 3 may be implemented in a computer, such as, for example, server 104 in FIG. 1 or data processing system 200 in FIG. 2. For example, the process shown in FIG. 3 may be implemented in significant input feature manager 218 in FIG. 2.

The process begins when the computer receives a scoring payload data request for a set of scoring payload data corresponding to a set of input features of a machine learning model from a user of a client device via a network (step 302). The computer preprocesses the set of scoring payload data corresponding to the set of input features of the machine learning model by transforming non-numerical data of the set of scoring payload data into one of numerical data or machine readable data to form a set of preprocessed scoring payload data (step 304). The computer slices the set of preprocessed scoring payload data into a predefined number of batches by grouping the set of preprocessed scoring payload data based on at least one of timestamp, user-defined tags, clustering algorithm, and key performance indicator to form a sliced set of scoring payload data (step 306).

Using the sliced set of scoring payload data, the computer generates a correlation coefficient matrix for each respective input feature within the set of input features of the machine learning model for each batch in the predefined number of batches based on input of each particular input feature into the machine learning model and a corresponding output from the machine learning model for each particular input feature indicating all combinations of input features and corresponding machine learning model outputs per batch (step 308). The computer extracts a correlation coefficient value from the correlation coefficient matrix for each particular input feature and its corresponding output from the machine learning model per batch (step 310).

The computer identifies a set of significant input features per batch, each significant input feature in the set having a corresponding correlation coefficient value greater than or equal to a predefined correlation coefficient threshold level (step 312). The computer ranks the set of significant input features having correlation coefficient values greater than or equal to the predefined correlation coefficient threshold level per batch according to a corresponding correlation coefficient value of a respective significant input feature of a batch (step 314). The computer also performs a set of action steps automatically regarding the set of significant input features per batch (step 316). Thereafter, the process terminates.

Thus, illustrative embodiments of the present invention provide a computer-implemented method, computer system, and computer program product for identifying input feature significance for a machine learning model. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for identifying input feature significance for a machine learning model, the method comprising:

receiving a set of scoring data payload corresponding to a set of input features of the machine learning model;

slicing the set of scoring payload data into a predefined number of batches to form a sliced set of scoring payload data;

generating, using the sliced set of scoring payload data, a correlation coefficient matrix for each respective input feature within the set of input features of the machine learning model for each batch in the predefined number of batches based on input of each particular input feature into the machine learning model and a corresponding output from the machine learning model for each particular input feature indicating all combinations of input features and corresponding machine learning model outputs per batch;

extracting a correlation coefficient value from the correlation coefficient matrix for each particular input feature and the corresponding output from the machine learning model per batch;

identifying a set of significant input features having a corresponding correlation coefficient value greater than or equal to a predefined correlation coefficient threshold level per batch; and performing a set of action steps automatically regarding the set of significant input features per batch, wherein the computer-implemented method is executed in real time as scoring data payload is received, input features are applied to the machine learning model, and as outputs are generated by the machine learning model.

2. The computer-implemented method of claim 1 further comprising:

ranking the set of significant input features having correlation coefficient values greater than or equal to the predefined correlation coefficient threshold level per batch according to a corresponding correlation coefficient value of a respective significant input feature of a batch.

3. The computer-implemented method of claim 1 further comprising:

receiving a scoring payload data request for the set of scoring payload data corresponding to the set of input features of the machine learning model from a user of a client device via a network; and preprocessing the set of scoring payload data corresponding to the set of input features of the machine learning model.

4. The computer-implemented method of claim 3, wherein the preprocessing of the set of scoring payload data includes transforming non-numerical data of the set of scoring payload data into one of numerical data or machine readable data.

5. The computer-implemented method of claim 1, wherein the set of scoring payload data is sliced into the predefined number of batches by grouping the set of scoring payload data based on at least one of timestamp, user-defined tag, clustering algorithm, and key performance indicator.

6. The computer-implemented method of claim 1, wherein the set of scoring payload data is one of real time production data or real time live data.

7. The computer-implemented method of claim 1, wherein the corresponding output of each particular input feature includes a prediction, probability of the prediction, and explainability.

8. The computer-implemented method of claim 1, wherein the set of action steps include one or more of:
  automatically transmitting the set of significant input features per batch to a user for review to determine which data are important to the user in making decisions,
  performing data analysis to identify relationships between business metrics and input feature significance to determine which input features impact a greatest number of business metrics,
  performing data engineering by utilizing correlation coefficient values among input features to identify duplicates and similarities among the input features to increase performance of the machine learning model, and
  analyzing correlation coefficient value trends of input features to detect data drift and data anomalies in the machine learning model.

9. The computer-implemented method of claim 1, wherein the correlation coefficient value is a numerical value indicating an amount of relationship between an input feature and its corresponding output from the machine learning model.

10. A computer system for identifying input feature significance for a machine learning model, the computer system comprising:
  a bus system;
  a storage device connected to the bus system, wherein the storage device stores program instructions; and
  a processor connected to the bus system, wherein the processor executes the program instructions to:
    receive a set of scoring data payload corresponding to a set of input features of the machine learning model;
    slice the set of scoring payload data into a predefined number of batches to form a sliced set of scoring payload data;
    generate, using the sliced set of scoring payload data, a correlation coefficient matrix for each respective input feature within the set of input features of the machine learning model for each batch in the predefined number of batches based on input of each particular input feature into the machine learning model and a corresponding output from the machine learning model for each particular input feature indicating all combinations of input features and corresponding machine learning model outputs per batch;
    extract a correlation coefficient value from the correlation coefficient matrix for each particular input feature and the corresponding output from the machine learning model per batch;
    identify a set of significant input features having a corresponding correlation coefficient value greater than or equal to a predefined correlation coefficient threshold level per batch; and
    perform a set of action steps automatically regarding the set of significant input features per batch,
    wherein the processor executes the program instructions in real time as scoring data payload is received, as input features are applied to the machine learning model, and as outputs are generated by the machine learning model.

11. The computer system of claim 10, wherein the processor further executes the program instructions to:
  rank the set of significant input features having correlation coefficient values greater than or equal to the predefined correlation coefficient threshold level per batch according to a corresponding correlation coefficient value of a respective significant input feature of a batch.

12. The computer system of claim 10, wherein the processor further executes the program instructions to:
  receive a scoring payload data request for the set of scoring payload data corresponding to the set of input features of the machine learning model from a user of a client device via a network; and
  preprocess the set of scoring payload data corresponding to the set of input features of the machine learning model.

13. The computer system of claim 12, wherein preprocessing the set of scoring payload data includes transforming non-numerical data of the set of scoring payload data into one of numerical data or machine readable data.

14. The computer system of claim 10, wherein the set of scoring payload data is sliced into the predefined number of batches by grouping the set of scoring payload data based on at least one of timestamp, user-defined tag, clustering algorithm, and key performance indicator.

15. A computer program product for identifying input feature significance for a machine learning model, the computer program product comprising a computer readable storage medium having program instructions embodied therewith, the program instructions executable by a computer to cause the computer to perform a method of:
  receiving a set of scoring data payload corresponding to a set of input features of the machine learning model;
  slicing the set of scoring payload data into a predefined number of batches to form a sliced set of scoring payload data;
  generating, using the sliced set of scoring payload data, a correlation coefficient matrix for each respective input feature within the set of input features of the machine learning model for each batch in the predefined number of batches based on input of each particular input feature into the machine learning model and a corresponding output from the machine learning model for each particular input feature indicating all combinations of input features and corresponding machine learning model outputs per batch;
  extracting a correlation coefficient value from the correlation coefficient matrix for each particular input feature and the corresponding output from the machine learning model per batch;
  identifying a set of significant input features having a corresponding correlation coefficient value greater than or equal to a predefined correlation coefficient threshold level per batch; and
  performing a set of action steps automatically regarding the set of significant input features per batch, wherein the method is executed by the computer in real time as scoring data payload is received, as input features are applied to the machine learning model, and as outputs are generated by the machine learning model.

16. The computer program product of claim 15 further comprising:
ranking the set of significant input features having correlation coefficient values greater than or equal to the predefined correlation coefficient threshold level per batch according to a corresponding correlation coefficient value of a respective significant input feature of a batch.

17. The computer program product of claim 15 further comprising:
receiving a scoring payload data request for the set of scoring payload data corresponding to the set of input features of the machine learning model from a user of a client device via a network; and
preprocessing the set of scoring payload data corresponding to the set of input features of the machine learning model.

18. The computer program product of claim 17, wherein the preprocessing of the set of scoring payload data includes transforming non-numerical data of the set of scoring payload data into one of numerical data or machine readable data.

19. The computer program product of claim 15, wherein the set of scoring payload data is sliced into the predefined number of batches by grouping the set of scoring payload data based on at least one of timestamp, user-defined tag, clustering algorithm, and key performance indicator.

20. The computer program product of claim 15, wherein the set of scoring payload data is one of real time production data or real time live data.

* * * * *